United States Patent [19]

Thorn

[11] Patent Number: 4,872,651
[45] Date of Patent: Oct. 10, 1989

[54] FLUID FILLED RESILIENT BUSHING

[75] Inventor: Richard P. Thorn, Erie, Pa.

[73] Assignee: Lord Corporation, Erie, Pa.

[21] Appl. No.: 167,943

[22] Filed: Mar. 14, 1988

[51] Int. Cl.$^4$ .............................................. F16F 5/00
[52] U.S. Cl. .............................. 267/140.1; 267/140.5; 267/293; 248/562
[58] Field of Search .................. 267/140.1, 136, 140.3, 267/140.5, 141, 141.1, 141.2, 153, 141.3, 137, 293, 292, 294, 257, 258, 163, 201, 35, 281; 248/557, 562, 636; 180/300, 312, 902; 384/99, 125, 215, 220, 222

[56] References Cited

U.S. PATENT DOCUMENTS 4,705,410  11/1987  Broock ........................... 267/140.1
4,739,979  4/1988  Kanda ............................. 267/140.1

FOREIGN PATENT DOCUMENTS 2841505  3/1980  Fed. Rep. of Germany .
324987  11/1957  Switzerland ....................... 267/294

Primary Examiner—George E. A. Halvosa
Assistant Examiner—Mark T. Le
Attorney, Agent, or Firm—Philip P. McCann; James W. Wright

[57] ABSTRACT

A fluid filled resilient bushing assembly for rotary vibratory motion control, particularly adapted for use in a joint between a motion inducing member and a base member, having an elongate outer rigid sleeve member, an elongate inner rigid member rotatable with respect to the outer rigid sleeve member and a resilient means interposed between the inner and outer members. The resilient means defines at least two spaced chambers interconnected by an elongate restricted passageway filled with incompressible fluid. The bushing assembly further has a pressure differential inducing means creating a differential in the fluid pressure of the chambers due to the rotary motion of the inner rigid member to permit contraction of one of the chambers, expansion of the second chamber and fluid flow therebetween providing damping of the rotary vibratory motion.

31 Claims, 3 Drawing Sheets

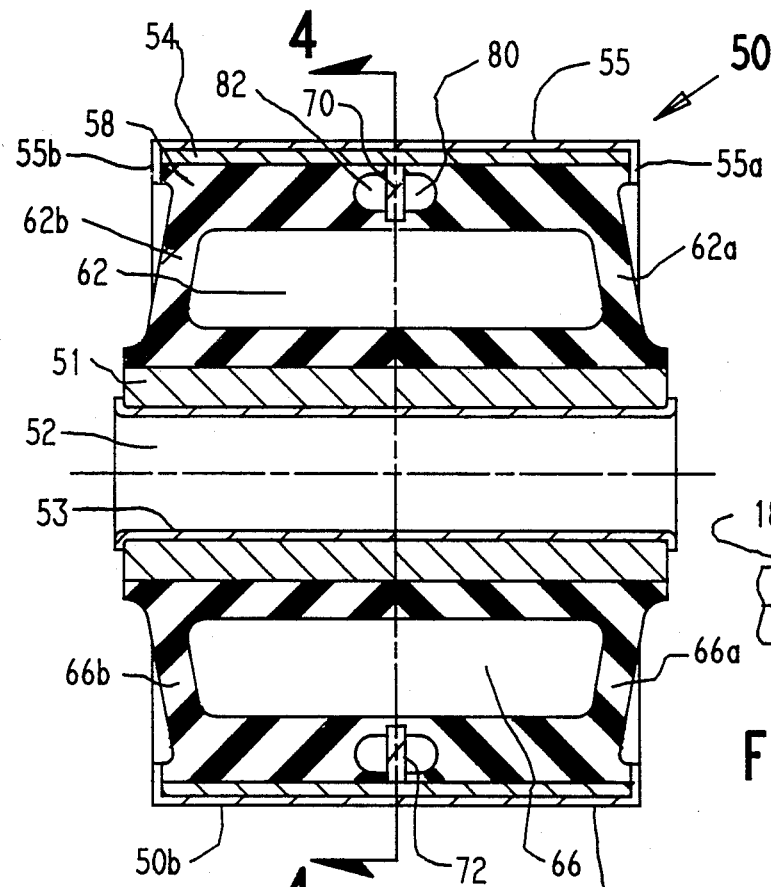
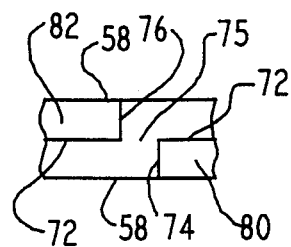
FIGURE 4A
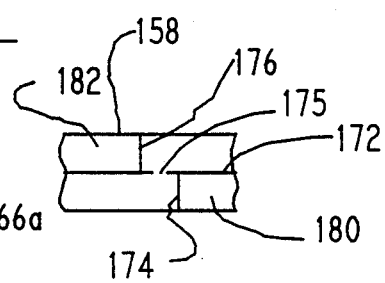
FIGURE 4B
FIGURE 3
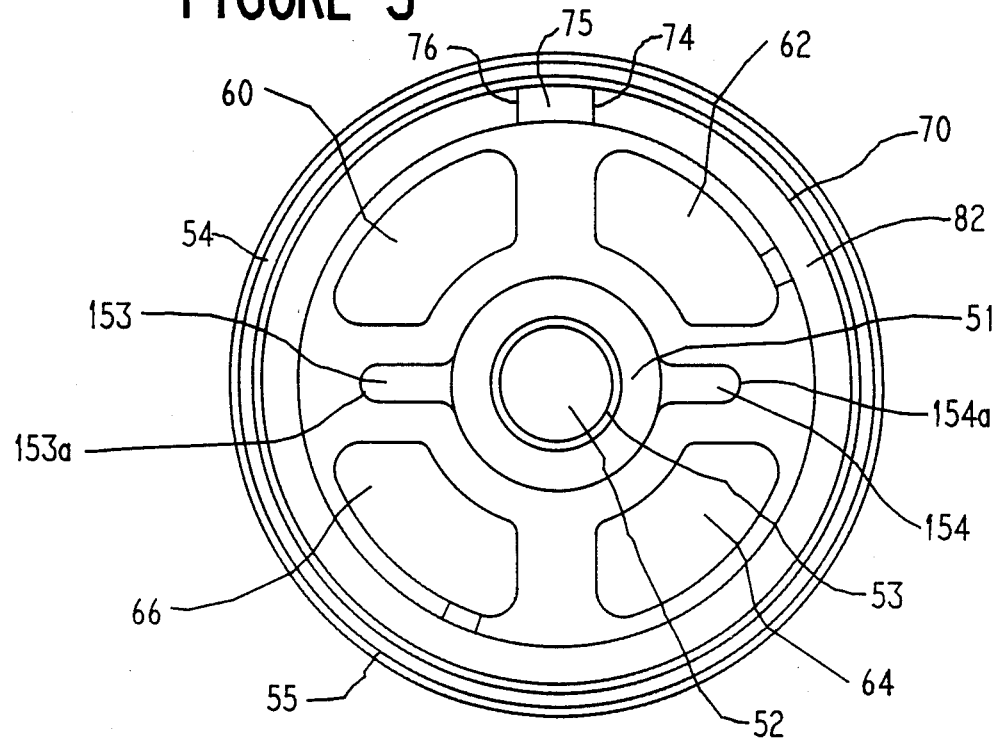
FIGURE 4

FLUID FILLED RESILIENT BUSHING

FIELD OF THE INVENTION

The present invention relates to fluid filled resilient bushing assemblies, and more particularly the present invention relates to fluid filled resilient bushing assemblies suitable for damping rotary oscillatory motions.

BACKGROUND OF THE INVENTION

Bushing assemblies are generally located at a connecting joint between a base member and a motion inducing member in such applications as machinery, airplanes, boats and vehicular transportation. The function served by bushing assemblies is to accommodate motion between the motion inducing member and the base member and to dampen out oscillatory or vibratory motions. Such vibratory motions may include a wide range of frequencies, ranging from small to large amplitudes, and may occur in various directions of the bushing assembly including radial, axial as well as rotary vibrations. In most applications it is desirous to protect the base member from such vibratory motions.

The arrangement of the base member and the motion inducing member with respect to the connecting joint are dependent on the particular design and application. In most applications, the base member has an arm intermediate of two ends, one end having a mating member forming a part of the connecting joint and the other end affixed to a body wherein it is desirous that vibratory motions be eliminated. Such a body may be a frame of an automobile, sensitive equipment or a drive shaft when the bushing assembly is used as a coupling.

The motion inducing member generally has an elongated arm intermediate of two ends, one end affixed to a motion inducing source and the other end having a mating member forming a complimentary part of the connecting joint. The motion inducing source generates various motions including vibratory motions that are accommodated along the elongated arm to the bushing assembly in the connecting joint. As mentioned above, such accommodated motions relative to the bushing assembly may be radial, axial or rotary.

The bushing assembly is affixed within the housing of the connecting joint to control static and dynamic motions as well as accommodate movement between the motion inducing member and the body. In particular a primary purpose of a bushing assembly is to substantially reduce or dampen the vibratory motions at the connecting joint. Damping occurs when the energy of the vibratory motion is dissipated by the bushing assembly. Damping controls the response of the base member at or near the resonance frequency of the motion inducing member. In particular, damping diminishes the amplitude of the vibration at the resonance frequency. Increasing amounts of damping diminishes the amplitude of the vibratory motions. At or near a resonance frequency, damping is the only means of controlling motion because the other two factors affecting response, mass and stiffness transfer energy. Uncontrolled resonant response can provide excessive base member motion which, in turn, leads to impaired reliability or structural failure.

The most common type of bushing assembly is a rubber bushing. Rubber bushings generally comprise annular elongate inner and outer members with elastomer disposed therebetween. Such bushings are used to control and transmit movement at the connecting joint, but have limited capability in damping vibratory motions. Damping provided by rubber bushings is a function of the hysteresis property of the elastomer. In general, rubber bushings can be said to provide little damping.

One form of bushing assembly which can provide improved damping are fluid filled bushings. Fluid filled bushings generally include a cylindrical elongate inner rigid member, an elongate outer rigid sleeve member concentrically disposed and radially spaced from the inner member and a resilient means disposed beteen the inner member and outer sleeve member wherein the resilient elastomeric means defines a pair of circumferentially spaced and diametrically opposed fluid filled chambers fluidly connected by an elongate restricted passageway. In response to vibratory motions along the radial direction of the bushing assembly between the inner member and the outer sleeve member fluid is displaced from one chamber via the restricted passageway to the second chamber in a direction opposite to the vibratory motion. In particular, when a first chamber is contracted by a vibratory motion in a radial direction, the fluid is displaced therefrom through the restricted passageway to an expanding second chamber in opposite radial direction. In the reverse cycle of the vibratory motion, when the first chamber is expanding and the second chamber is contracting, the fluid is reversibly moved through the restricted passageway. As can be seen, an oscillatory motion of the fluid is generated within the restricted passageway between two chambers. The oscillatory fluid in the restricted passageway creates a mass or inertia resistance to the pumping forces of the chambers which act together in a mass-spring relationship resulting in damping of the vibratory motions along the radial direction.

An example of such a fluid filled bushing is disclosed in U.S. Pat. No. 3,642,268. The bushing therein disclosed utilizes hydraulic fluid displaceable between two diametric chambers via a restricted orifice. The chambers are located in the bushing along a first radial direction whereas along a second radial direction perpendicular to the first radial direction is a solid rubber member which extends along the axial direction of the bushing. Such a fluid filled bushing exhibits low stiffness and high damping along the first radial direction dependent on the flow characteristics between the chambers and the fluid properties as described heretofore and high stiffness and low damping along the axial and rotary directions.

A fluid filled bushing for damping vibrations in both the radial and axial directions is disclosed in U.S. Pat. No. 4,667,942. The bushing therein disclosed utilizes hydraulic fluid displaceable between two sets of two chambers, the first set of two chambers provides damping in the axial direction and the second set of two chambers provides damping in the radial direction. The two sets of two chambers are fluidly interconnected via two restricted passageways. Vibratory motions in the radial direction are dampened by the transfer of fluid between the first set of two chambers via the two restricted passageways and vibratory motions in the axial direction are dampened by the transfer of fluid between the second set of two chambers via the two restricted passageways.

While the fluid filled bushings disclosed in the referenced patents function satisfactorily for their intended use of damping vibratory motions in the radial and/or axial directions, there is a need for a fluid filled bushing assembly which can satisfactorily dampen rotary vibratory motions. In certain applications, the bushing assembly in the connecting joint is exposed to rotary vibratory or also described as rotary oscillatory motion. In one application a bushing assembly would supplant a coupling providing damping between the drive member and the driven member. In another application a bushing assembly could be a focal point between two arms wherein the bushing assembly would provide damping of the oscillatory motion. The bushing assemblies of the prior art are inadequate to provide damping of rotary oscillatory motions in such applications.

OBJECTS OF THE INVENTIONS

With the foregoing in mind, a primary object of the present invention is to provide an improved fluid filled resilient bushing assembly particularly suited for damping rotary oscillatory motions between components of the bushing assembly.

Another object of the present invention is to provide a novel fluid filled resilient bushing assembly providing damping amplitudes of rotary oscillatory motions at excitations of resonant frequencies.

Another object of the present invention is to provide a novel fluid filled resilient bushing assembly suitable for damping oscillatory rotary motions having a inner rigid member rotatable with respect to the outer rigid sleeve member.

Another object of the present invention is to provide a novel fluid filled resilient bushing assembly suitable for damping rotary oscillatory motions having two chambers fluidly interconnected by a restricted passageway providing for unidirectional flow of the fluid from a contracting chamber to an expanding chamber through a distance greater than the length of the restricted passageway.

Yet another object of the present invention is to provide a novel fluid filled resilient bushing assembly wherein damping of vibratory motion in the rotary direction is the result of a pressure differential inducing means creating a differential in the fluid pressure between two chambers in response to rotary oscillatory motions.

SUMMARY OF THE INVENTION

More specifically, in the present invention a fluid filled resilient bushing assembly suitable for damping rotary oscillatory motions is described having an elongate inner rigid member disposed within and radially inwardly spaced from an elongate outer rigid sleeve member and defining a space therebetween. A resilient means is disposed about the inner rigid member between the inner and outer rigid members for sealingly connecting the two members together and to permit the inner rigid member to rotate bidirectionally with respect to the outer rigid sleeve member. The resilient means defines at least two spaced chambers interconnected by an elongate restricted passageway. The chambers and passageway are filled with an incompressible fluid. A fluid pressure differential between the two chambers is created by a pressure differential inducing means in response to the rotary oscillatory movement of the inner rigid member with respect to the outer rigid sleeve member causing contraction of one chamber, and expansion of the second chamber resulting in flow of fluid through the restricted passageway from the contracting chamber to the expanding chamber.

In another embodiment of the present invention the elongate restricted passageway extends continuously annularly between the inner and outer members. The restricted passageway includes two adjacent passages separated by a divider means. The passages fluidly communicate respectively with a contracting chamber and an expanding chamber. Each of the passages have a solid means blocking the passage at a selected location. The two passages are fluidly interconnected through a port or orifice located between the solid means to cause unidirectional flow of the fluid from a contracting chamber to an expanding chamber for a length greater than the length of a passage.

Furthermore, the pressure differential inducing means in the embodiment is a paddle projecting radially outwardly from the inner rigid member and adjacent a chamber to permit the paddle to contract the chamber during rotation of the inner rigid member.

BRIEF DESCRIPTION OF THE DRAWINGS

The foregoing and other objects, features and advantages should become apparent from the following description taken in conjunction with the accompanying drawings in which:

FIG. 3 is a longitudinal sectional view taken along the mid axial plane of a bushing assembly of a second embodiment of the present invention showing a restricted passageway extending continuously annularly between the four chambers and outer rigid sleeve member having two adjacent and separated passages;

FIG. 4 is a cross-sectional view taken along the line 4—4 of the embodiment shown in FIG. 3 showing the restricted passageway having two adjacent and separated passages, one passage fluidly interconnecting diametric chambers about a first radial axis, and the second passage fluidly interconnecting diametric chambers about a second radial axis orthogonal to the first radial axis, and the inner rigid member is shown having two diametric paddles projecting radially outwardly therefrom;

FIG. 4A is a sectional view of the restricted passageway showing a portion of each of the two passages, each passage having a solid means and a port between the solid means fluidly interconnecting the two passages to provide unidirectional fluid flow;

FIG. 4B is a sectional view of the restricted passageway showing an orifice fluidly interconnecting the two passages;

DESCRIPTION OF THE PREFERRED EMBODIMENTS

Figure 1:
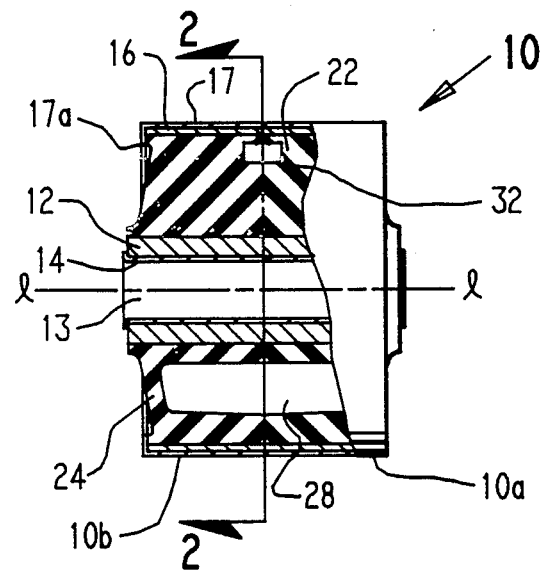
FIG. 1 is a partial longitudinal sectional view taken along the mid axial plane of a bushing assembly of a first embodiment of the present invention showing the inner and outer rigid members and the resilient means disposed therebetween.
Figure 2:
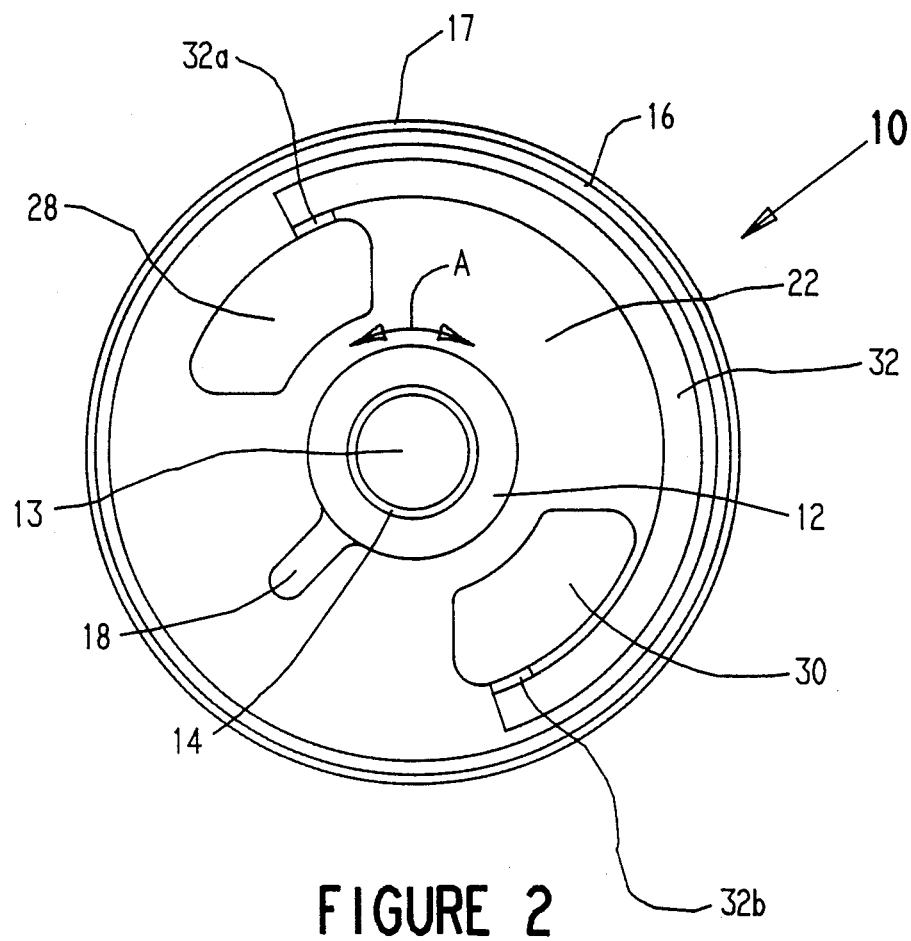
FIG. 2 is a view taken along line 2—2 of FIG. 1 showing a cross-sectional view of the bushing assembly, in particular the relationship of the chambers and restricted passageway and oscillatory rotation of the inner rigid member relative to the outer sleeve member.

Referring now to the drawings, FIG. 1 illustrates a partial longitudinal sectional view having the sectional view taken along the mid axial plane of a fluid filled resilient bushing assembly 10 of a first embodiment of the present invention. For clarity, FIG. 2 illustrates an elevational cross-sectional view taken along line 2—2 of FIG. 1 occurring at the point of abutment of matching halves 10a, 10b of the bushing assembly 10. The bushing assembly 10 includes a cylindrical elongate inner rigid member 12 having an annular bore 13 there through. Extending through the bore 13 is a close fitting annular member 14 which is crimped about the axial outer edges of the inner rigid member 12. The inner rigid member 12 and the close fitting member 14 are suitable to receive a member (not shown) to connect the bushing assembly 10 to an external system and allow for rotary oscillatory motion of the inner rigid member 12. Such a member could be keyed or affixed to said close fitting member 14 and inner rigid member 12 to provide such motion. In the present application the amount of oscillation is generally limited by the bushing assembly up to about ±20°.

A cylindrical elongate outer rigid sleeve member 16 is concentrically disposed about and radially outwardly spaced from the inner rigid member 12 to define an annular space therebetween. A close fitting annular member 17 encircles the outer rigid sleeve member 16 and is crimped about the axial edges thereof having extensions 17a perpendicular to the body thereof. The close fitting members 14, 17 are incorporated into the present invention to sealingly fit the two mating halves 10a, 10b of the bushing assembly 10 together. In the present embodiment, the inner rigid member 12, the outer sleeve member 16 and close fitting members 14, 17 are made of cold drawn low carbon steel. Other rigid materials may be used depending on the designer's choice.

A resilient means 22 is disposed between the inner rigid member 12 and the outer rigid sleeve member 16. In the present embodiment, the resilient means 22 is made of elastomeric material such as high temperature natural rubber into a unitary piece for each matching half 10a, 10b. Each unitary piece is disposed between the inner and outer members 12, 16 sealingly combining said members. The inner rigid member 12 and outer rigid sleeve member 16 are preferably bonded to the resilient means 22 by a suitable elastomer to metal adhesive. As shown in FIG. 1, the extension 17a of the close fitting annular member 17 is crimped over the resilient means 22 as is the opposite end axially clamping the resilient means 22.

The resilient means 22 further serves to define a pair of circumferentially spaced chambers 28, 30, two bulgable end walls 24 disposed at each of the axial ends of the chambers 28, 30, only one of which is shown and a restricted passageway 32 disposed radially outwardly of the chambers 28, 30 between the chambers 28, 30 and the outer sleeve member 12 fluidly interconnecting the two chambers 28, 30. The pair of chambers 28, 30 and the restricted passageway 32 are filled with a substantially incompressible working fluid, not shown, such as a mixture of ethylene glycol and water. Each of the defined components along with the fluid serve to provide damping of the external imputed rotary oscillatory motions. As shown in FIG. 2, the chambers 28, 30 are circumferentially equally spaced and are diametric about the inner rigid member 12. As shown in FIG. 1, each chamber is elongate along and parallel to the longitudinal axis depicted by line 1—1 of the bushing assembly 10. Each bulgable end wall 24 is sized by thickness to bulge responsive to the varying pressure in the chamber. In the present embodiment, the thickness of each bulgable end wall 24 ranges from about 0.020 to about 0.250 inches. The restricted passageway 32 extends arcuately from one chamber 28 to the other chambers 30, radially inward of the outer rigid sleeve member 16. The restricted passageway 32 has a port 32a at one end extending radially inwardly into one chamber 28, and a port 32b at its other end extending radially inwardly into the other chamber 30. As shown in FIG. 1, the restricted passageway 32 is molded into each abutting half of the resilient means 22. The restricted passageway 32 has a length suitable to connect the two chambers 28, 30. As shown, In FIG. 2, the restricted passageway extends about 50% of the circumferential length of the bushing assembly 10.

In the present invention, fluid flow between the two chambers 28, 30 occurs when a pressure differential inducing means creates a differential in fluid pressure between the two spaced chambers 28, 30 in response to rotary oscillatory movement of the inner rigid member 12 with respect to the outer rigid sleeve member 16. Such a pressure differential occurs when one chamber is contracted or compressed and the second chamber expands due to the flow of fluid from the contracting chamber thereto. In the embodiment shown in FIGS. 1 and 2, the pressure differential inducing means is a single paddle 18 fixed to and projecting radially outwardly from the inner rigid member 12 circumferentially intermediate chambers 28, 30. The paddle extends outwardly to about 50% of the radial distance between the inner rigid member 12 and outer sleeve member 16. The single paddle 18 is positioned intermediate to chambers 28, 30 such that during clockwise rotary motion, as viewed in FIG. 2, of the inner rigid member 12 the single paddle 18 rotates in the direction of chamber 28 causing contraction thereof. During contraction of chamber 28, fluid is expended from the chamber 28 through the port 32a to the restricted passageway 32 to the chamber 30 causing expansion thereof. When the paddle 18 is rotated in the opposite direction, counterclockwise as shown in FIG. 2, and approaches the intermediate position between the chambers 28, 30 the pressure differential between the two chambers 28, 30 diminishes resulting in the fluid flowing from chamber 30 to chamber 28. The fluid will continue to flow from chamber 30 to chamber 28 until the fluid reaches substantially equal pressure in the two chambers 28, 30, generally occurring when the single paddle returns to the immediate position between the chambers 38, 30. When the single paddle is rotated toward chamber 30 an opposite contraction/expansion of the chambers 28, 30 occurs.

Amplitudes of rotary oscillatory motion at a predetermined frequency range are effectively damped by the present invention through the cooperation of the working fluid in the restricted passageway 32 and the two chambers 28, 30 along with the bulgable end walls 24. The chambers 28, 30 act as pistons to pump the working fluid through the restricted passageway 32 between the chambers 28, 30. In the process of pumping the liquid through the restricted passageway, the chambers will bulge slightly such that not all the liquid displaced is forced through the restricted passageway 32. This bulging effect is expressible as the ratio of the chamber volume change to pressure change and is called compliance. Thus $C = dv/dP$. Compliance directly affects the effect of the restricted passageway 32. If the compliance is "stiff" (i.e., little bulge), then the influence of the restricted passageway 32 is greater, increasing the damping of the amplitude of the rotary oscillatory motion. If the compliance is "soft" (i.e., large bulge), then the influence of the restricted passageway is lesser, decreasing the damping of the amplitude of the rotary oscillatory motion. Furthermore, compliance directly affects the resonant frequency the bushing is responsive to. If the compliance is stiff, the bushing is responsive to a higher resonant frequency. If the compliance is soft, the bushing is responsive to a lower resonant frequency.

Damping within the bushing assembly 10 is produced by the resistance to the flow of fluid through the restricted passageway 32. As rotary oscillatory motion is applied to the bushing assembly 10, the mass of working fluid subject to the pumping action of one chamber flows back and forth in the restricted passageway 32 into and out of the chambers. The oscillating fluid in the restricted passageway 32 offers a mass like resistance to the pumping forces. Damping favorably controls the response of the bushing assembly at or near the resonance frequency of the motion inducing member. In particular the bushing assembly according to the present invention provides damping at a predetermined frequency of less than about 50 Hertz.

During operation, rotary oscillatory motions represented in FIG. 2 by the arrow A induce rotary oscillatory motions of the inner rigid member 12 relative to the outer rigid sleeve member 16. The defined oscillatory motions alternatively contract and expand the chambers 28, 30 causing the working fluid to oscillate in the restricted passageway 32 between the two chambers 28, 30. In particular, when the rotary vibratory motion turns the rigid inner member 12 clockwise along with the paddle 18, chamber 28 is contracted pushing the working fluid through the port 32a into the restricted passageway 32 and out the port 32b into expanding chamber 30. As previously described, the inertia of the fluid movement in the restricted passageway causes damping vibratory motion between the inner rigid member 12 and the outer sleeve member 16. When the rotary oscillatory motion reverses and rotates the inner rigid member 12 in the opposite direction, the chamber 30 is contracted pushing the working fluid therefrom through the port 32b into the restricted passageway 32 and out the port 32a into the expanding chamber 28. The oscillatory motion is dampened by the resistance or inertia to the fluid flow through the cooperation of the restricted passageway 32 and the chambers 28, 30.

Another embodiment of the present invention is shown in FIGS. 3, 4, 4A and 4B. FIG. 3 illustrates a partial longitudinal section view having the sectional view taken along the mid axial plane of a fluid filled resilient bushing assembly 50. For clarity, FIG. 4 illustrates an elevated cross-sectional view taken along line 4—4 of FIG. 3 occurring at the point of abutment of the matching halves 50a, 50b of the bushing assembly 50.

The second embodiment is similar to the first embodiment having an inner rigid member 51, a bore 52, and a close fitting member 53 extending through the bore 52. A cylindrical elongate outer rigid member 54 is concentrically disposed about and radially outwardly spaced from the inner rigid member 51. A close fitting member 55 encircles the outer rigid sleve member 54 and is crimped about the axial edges thereof having perpendicular extensions 55a. A resilient means 58 is disposed between the inner and outer members 51, 54. The resilient means 58 define four circumferentially spaced chambers 60, 62, 64, 66, bulgable end walls 62a, 62b, 66a, 66b and a restricted passageway 70 fluidly interconnecting the chambers 60, 62, 64, 66.

The four chambers 60, 62, 64, 66 are operative as two separate pairs when transferring fluid from contracting to expanding chambers. One pair of chambers 60, 64 is defined as diametric about the inner rigid member 51 along a first radial axis and the second pair of chambers 62, 66 is diametric about the inner rigid member 51 along a second radial axis orthogonal to the first radial axis. Each pair of chambers operate in the same but opposite mode. When one pair of chambers 60, 64 contract, the second pair of chambers 62, 66 expand. When the second pair of chambers 62, 66 contract, the first pair of chambers 60, 64 expand. The four chambers generally have equal volume and shape. Each of the chambers 60, 62, 64, 66 have two axially spaced bulgable end walls similar to the first embodiment depicted for two chambers in FIG. 3 as 62a, 62b, 66a, 66b.

The four chambers are fluidly interconnected by the restricted passageway 70 extending continuously annularly through 360° and disposed radially outwardly of the four chambers 60, 62, 64, 66 between the four chambers 60, 62, 64, 66 and the outer rigid sleeve member 51. The restricted passageway 70 includes a divider means radially bisecting passageway 70 and dividing it into substantially equal passages 80, 82. The divider means is in the form of a median plate 72. The median plate 72 extends continuously from about 300° to about 350° of the length of the restricted passageway 70. Due to the non-continuous or broken area of the plate 72, fluid communication can take place between the passages 80, 82. As shown in FIG. 3 the median plate 72 is positioned and affixed at the abutment of the two matching halves 50a, 50b of the bushing assembly 50.

Referring now to FIG. 4A, located at each end of the continuous median plate 72 are solid means 74, 76 to block the flow of fluid through passages 80, 82 beyond the solid means 74, 76. Each solid means 74, 76 extends radially oppositely from the median plate 72 to interface with the adjacent resilient means 58 for about one half of the cross-sectional area of the restricted passageway. Preferably, each solid means 74, 76 is fixedly attached to an end of the median plate 72 and extends perpendicular thereto into a recessed portion (not shown) of the resilient means 58. The solid means 74, 76 may be an extension of median plate 72.

The two passages 80, 82 are fluidly interconnected between and adjacent solid means 74, 76 through a port 75 situated between the two proximal ends of the median plate 72. In particular the port 75 is defined by the two solid means 74, 76 and the opening between the two ends of the median plate 72. The restricted passageway 70 as defined herein permits fluid to flow through one passage 80, 82 from one solid means 74, 76 in a continuous unidirectional path through port 75 into the other passage 80, 82. The length of flow generated by the restricted passageway 70 as defined is substantially greater than the length thereof.

As shown in an alternative embodiment FIG. 4B, the continuous median plate 172 extends through 360° having two solid means 174, 176 affixed thereto. The median plate 172 further has an orifice means 175 extending transversely therethrough between and adjacent the two solid means 174, 176 fluidly interconnecting the two passages 180, 182 permitting undirectional flow therethrough. As can be seen, the orifice means 175 is similar to the port 75 in that it fluidly interconnects the two passages 180, 182.

The spaced chambers 60, 62, 64, 66 are fluidly interconnected with the passages 80, 82 to provide unidirectional flow from one pair of contracting chambers to the pair of expanding chambers. Chambers 60, 64 operating in the same mode are fluidly interconnected with one passage 80, 82 and chambers 62, 66 operating in the opposite mode are fluidly interconnected with the other passage 80, 82. In particular, chambers 60, 64 are fluidly interconnected by ports (not shown) to the passage 80 and the chambers 62, 66 are fluidly interconnected by ports to the passage 82. Each of the ports have a semicircular, cross-sectional area extending axially from the median plate 72 to the resilient means 58. The ports interconnecting the chambers 60, 64 extend axially in the opposite direction to. It is preferred that a solid means 74, 76 is positioned proximally to one of the ports to the chambers to diminish length of a passage 80, 82 not utilized in the flow of the fluid.

In the present invention, the flow of fluid from a pair of contracting chambers 60, 64, for example to a pair of expanding chambers is unidirectional. When the chambers 60, 64 are contracted responsive to rotary oscillatory motion, the fluid is expanded from the chambers 60, 64 into the passage 80. The blocking means 74 prevents the fluid from moving in a clockwise direction in the FIG. 4, and results in counter clockwise flow of the fluid. The fluid flows from the expanding chambers 60, 64 through the passage 80 and the port 75 to the passage 82. The fluid then flows into the chambers 62, 66 causing expansion thereof. Contraction of chambers 62, 66 result in reversal of the flow.

The embodiment further shows the pressure differential inducing means as paddles 153, 154, each diametrically projecting radially outwardly from the inner rigid member 52 and spaced proximally to the chambers 60, 62, 64, 66. The radial outermost portion 153a, 154a of each paddle is disposed about 50% of the radial distance between the inner rigid member 52 and the outer rigid sleeve member 51. Each of the paddles 153, 154 are suitably attached to said inner rigid member 52 to permit concurrent movement of each paddle 153, 154 with the inner rigid member 52 affecting contraction of a pair of chambers. In the present embodiment the paddles 153, 154 are formed a part of the inner rigid member 52. Other embodiments would include paddle means fixedly attached to the inner rigid member 52 by welding or other means. As shown in FIG. 4, clockwise rotation of the paddle 153, 154 affects contraction of the chambers 60, 64 and counter clockwise rotation affects contraction of chambers 62, 66.

The manufacture of fluid filled bushing assemblies is well-known to those skilled in the art and may be accomplished by several different methods. The fluid filled bushing assemblies of the present invention are manufactured by separately manufacturing two halves one of which is shown in FIG. 2. The manufacture of each half is similar wherein manufacture of one half will be described. The inner rigid member 12 and outer rigid sleeve member 16 are formed according to standard metal working methods where after parts are cleaned, and a primer and suitable rubber to metal adhesive is applied to surfaces to which rubber will be bonded. The inner rigid member 12 and outer rigid sleeve member 16 are placed in a mold which is then placed in a rubber injection vulcanizing press. The mold is preheated to suitable curing temperature dependent on the rubber used. The rubber is injected to form the resilient impact absorbing means 22. The bushing assembly half 10 is demolded, cleaned and readied for assembly. For the embodiment of FIG. 3, the divider means is then inserted. The chambers 28, 30 and the restricted passageway 32 of the two opposite halves are then filled with incompressible fluid by assembling the two molded halves in a fluid bath wherein the two halves are fluid sealed. A method used to fluidly seal the two halves is to use a close fitting member 14 inside the inner member 12 and crimping the member 14 around the end surfaces of the inner member 12 and similarly attaching a close fitting member 17 around the end surfaces of the outer rigid sleeve member 16.

Figure 5:
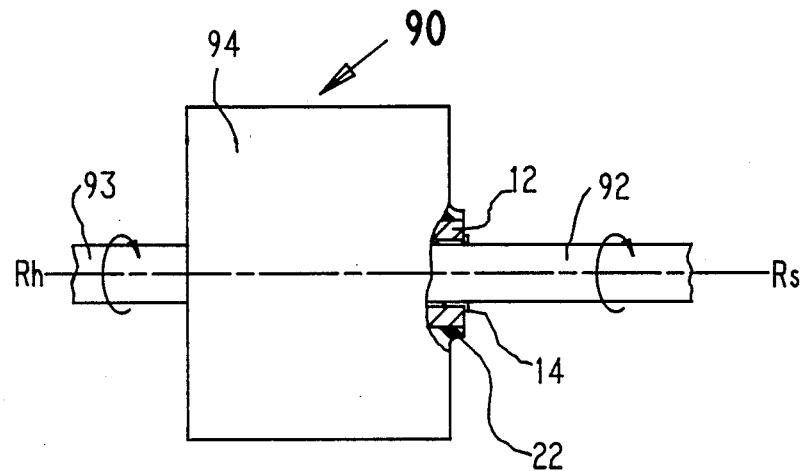
FIG. 5 is a plan view, with parts in section, of a coupling embodying a resilient bushing assembly of the present invention.

The fluid-filled bushing assembly 10, 50 may be suitably used as a coupling 90 as shown in FIG. 5. The coupling 90 is shown connecting a drive shaft 92 rotatable about an axis Rs to a driven shaft 93 rotatable about an axis Rh which may, be coaxial with the axis Rs of the drive shaft 92. The drive shaft 92 is fittedly disposed within the inner rigid member 12 and close fitting member 14 and attached thereto by conventional means (not shown) such as bolts, weldments, splines, keys, or the like. A hub 94 is secured to the driven shaft 93 and is fittedly disposed radially outwardly of the outer rigid sleeve member 16 and the corresponding close fitting member 17 and attached thereto by conventional means (not shown) such as bolts, weldments, splines, keys, or the like.

Figure 6:
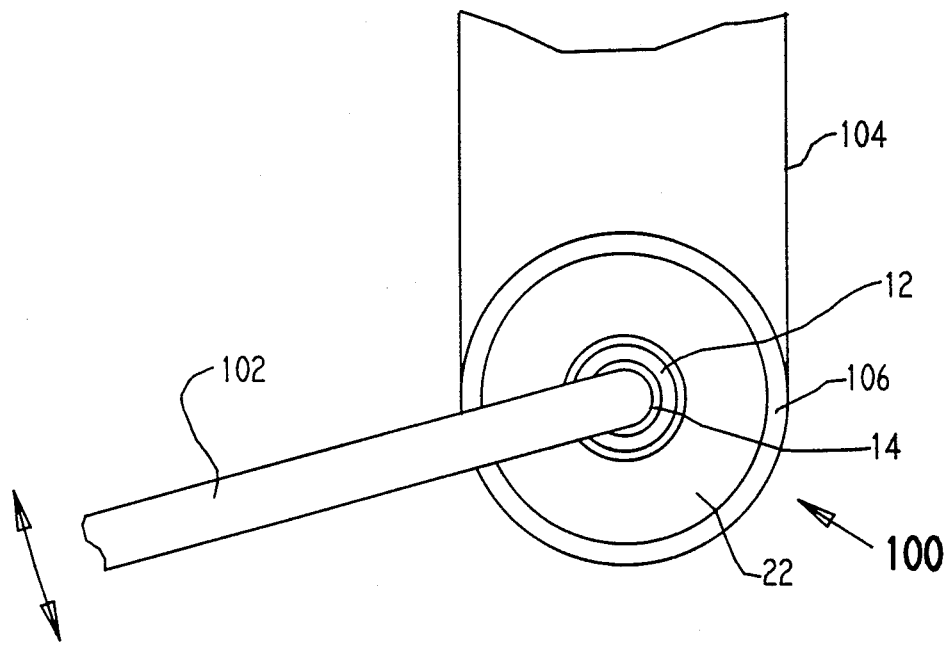
FIG. 6 is a plan view of a suspension system having a resilient bushing assembly of the present invention disposed between the oscillatory motion of the wheel and the frame of an automobile.

Now referring to FIG. 6, a typical connecting joint 100 incorporating a fluid filled bushing assembly 10 of the present invention is shown. The connecting joint 100 is shown connecting a motion inducing member 102 that rotably oscillates in a specific range to a base member 104 fixed to a large component such as an automobile. The motion inducing member 102 is fittedly disposed within the inner rigid member 122 and close fitting member 14 and attached thereto by conventional means (not shown) such as bolts, weldments, splines, keys, or the like. A hub 106 is secured to the base member 104 and is fittedly disposed radially outwardly of the outer rigid sleeve member 16 and the corresponding close fitting member 17 and attached thereto by conventional means described herein before.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid filled resilient bushing assembly for transmitting motion including rotary oscillatory motions between a motion inducing member and a base member while substantially damping rotary oscillatory motions between said members comprising:

an elongate outer rigid sleeve member;

an elongate inner rigid member disposed within and radially inwardly spaced from said outer sleeve member to define a space therebetween;

a resilient means disposed about said inner rigid member between said inner rigid member and said outer rigid sleeve member for sealingly connecting said inner rigid member to said outer rigid sleeve member to permit the inner rigid member to rotatably oscillate with respect to said outer rigid sleeve member while undergoing elastic stress during rotation, said resilient means defining at least two spaced chambers interconnected by an elongated restricted passageway; said spaced chambers including radial walls extending in the radial direction of the bushing assembly and circumferential walls extending in the circumferential direction of the bushing assembly; said restricted passageway interconnecting said spaced chambers only through said circumferential walls;

an incompressable fluid filling said spaced chambers and said restricted passageway, a pressure differential inducing means creating a differential in the fluid pressure of said at least two spaced chambers, resulting from said rotary movement of the inner rigid member with respect to the outer rigid sleeve member permitting contraction of one chamber, and expansion of the other chamber by fluid flow therebetween via said restricted passageway.

2. A fluid filled resilient bushing assembly according to claim 1 wherein said chambers are substantially equally circumferentially spaced about said inner rigid member.

3. A fluid filled resilient bushing assembly according to claim 1 wherein said elongate restricted passageway extends continuously annularly through 360° and comprises a divider means having (i) a median plate extending lengthwise and dividing said elongate restricted passageway into two adjacent medianly separated passages; (ii) two spaced and proximal solid means fully blocking said respective passages; and (iii) means operative between said two blocking means for fluidly interconnecting said two passages permitting unidirectional flow of said fluid through said two passages for a length greater than the length of said restricted passageway.

4. A fluid filled resilient bushing assembly according to claim 3 having said restricted passageway disposed radially outwardly of said two spaced chambers, between said two spaced chambers and said outer rigid sleeve member, and said solid means is fixedly secured to said median plate extending substantially perpendicular thereto.

5. A fluid filled resilient bushing assembly according to claim 4 wherein said pressure differential inducing means is a paddle fixed to and projecting radially outwardly from said inner rigid member and positioned proximally to said first chamber to permit said paddle to contract said first chamber during rotation of said inner rigid member.

6. A fluid filled resilient bushing assembly according to claim 4 wherein said resilient means define at least one bulgable end wall on each of said two spaced chambers to permit damping at a predetermined frequency of less than 50 Hertz.

7. A fluid filled resilient bushing assembly according to claim 4 wherein said resilient means defines two axially spaced bulgable end walls of each of said two spaced chambers to permit damping at a predetermined frequency of less than 50 Hertz.

8. A fluid filled resilient bushing assembly according to claim 4 wherein said resilient means defines at least four circumferentially spaced chambers, arranged in two separate pairs wherein a first pair of chambers are substantially diametric about the inner rigid member and are positioned along a first radial axis and a second pair of chambers are substantially diametric about the inner rigid member and are positioned along a second radial axis orthogonal to said first radial axis wherein said first pair of chambers are fluidly interconnected with one passage and said second pair of chambers are fluidly interconnected with said second passage; and an incompressible fluid filling said four circumferentially spaced chambers and said two passages.

9. A fluid filled resilient bushing assembly according to claim 8 wherein said resilient means defines at least one bulgable end wall of each of said chambers damping at a predetermined frequency of less than 50 Hertz.

10. A fluid filled resilient bushing assembly according to claim 8 wherein said resilient means defines two axially spaced bulgable end walls of each of said chambers to permit damping at a predetermined frequency of less than 50 Hertz.

11. A fluid filled resilient bushing assembly according to claim 8 wherein said pressure differential inducing means is two circumferentially spaced paddles each fixed to and projecting radially outwardly from said inner rigid member wherein each paddle is located between a chamber of said first pair of chambers and a chamber of said second pair of chambers to permit the two paddles to contract one pair of chambers during rotation of said inner rigid member.

12. A fluid filled resilient bushing assembly for transmitting motion including rotary motions between a motion inducing member and a base member while substantially damping rotary oscillatory motions between said members comprising:

an elongate outer rigid sleeve member;

an elongate inner rigid member disposed within and radially inwardly spaced from said outer sleeve member to define a space therebetween;

a resilient means disposed about said inner rigid member between said inner rigid member and said outer rigid sleeve member for sealingly connecting said inner rigid member to said outer rigid sleeve member to permit the inner rigid member to oscillate with respect to said outer rigid sleeve member while undergoing elastic stress during rotation, said resilient means defining at least four circumferentially spaced chambers, arranged in two separate pairs wherein a first pair of chambers are substantially diametric about the inner rigid member and are positioned along a first radial axis and a second pair of chambers are substantially diametric about the inner rigid member and are positioned along a second radial axis orthogonal to said first radial axis and an elongate restricted passageway;

an incompressible fluid filling said chambers and said restricted passageway;

said elongate restricted passageway extends continuously and annularly through 360° and comprises a divider means having (i) a median plate extending lengthwise and dividing said elongate restricted passageway into two medianly separated and adjacent passages; and (ii) two spaced and proximal solid means each respectively fixedly attached to an end of said median plate extending radially oppositely to sealingly combine said median plate with said resilient means to fully block said respective passages; and (iii) a port disposed between and proximal to said two solid means for fluidly interconnecting said two passages permitting unidirectional flow of said fluid from a contracting first pair of chambers to the expanding second pair of chambers such that said fluid flows unidirectionally through said two passages for a length greater than the length of said restricted passageway, wherein said first pair of chambers are fluidly interconnected with one passage and said second pair of chambers are fluidly interconnected with said second passage; said spaced chambers including radial walls extending in the radial direction of the bushing assembly and circumferential walls extending in the circumferential direction of the bushing assembly; said restricted passageway interconnecting said spaced chambers only through said circumferential walls; and a pressure differential inducing means creating a differential in the fluid pressure of said two pairs of chambers, resulting from said rotary movement of the inner rigid member with respect to the outer rigid sleeve member permitting contraction of one pair of chambers, expansion of the second pair of chambers by flow therebetween via said restricted passageway.

13. A fluid filled resilient bushing assembly according to claim 12 having said restricted passageway disposed radially outwardly of said four spaced chambers between said four spaced chambers and said outer rigid sleeve member and each of said two passages extend from about 300° to about 350° and said solid means is fixedly secured to said median plate section extending substantially perpendicular thereto.

14. A fluid filled resilient bushing assembly according to claim 13 wherein said resilient means defines at least one bulgable end wall of each of said chambers to permit damping at a predetermined frequency of less than 50 Hertz.

15. A fluid filled resilient bushing assembly according to claim 13 wherein said resilient means defines two axially spaced bulgable end walls of each of said chambers to permit damping at a predetermined frequency of less than 50 Hertz.

16. A fluid filled resilient bushing assembly according to claim 12 wherein said pressure differential inducing means is two circumferentially spaced paddles each affixed to and projecting radially outwardly from said inner rigid member wherein each paddle is located between a chamber of said first pair of chambers and a chamber of said second pair of chambers to permit the two paddles to contract one pair of chambers during rotation of said inner rigid member.

17. A fluid filled resilient bushing assembly for rotation oscillation control comprising:
an elongate outer rigid sleeve member;
an elongate inner rigid sleeve member disposed radially inwardly of said outer sleeve member to define a space therebetween and having a paddle projecting radially outwardly therefrom;
a resilient means disposed about said inner member between said inner rigid member and said outer rigid sleeve member;
said resilient means defining at least two circumferentially spaced chambers interconnected by an elongate restricted passageway; and
an incompressible fluid filling said circumferentially spaced chambers and said restricted passageway; said spaced chambers including radial walls extending in the radial direction of the bushing assembly and circumferential walls extending in the circumferential direction of the bushing assembly; said restricted passageway interconnecting said spaced chambers only through said circumferential walls; and
during rotary oscillatory motions of said inner rigid member along with said paddle with respect to said circumferentially spaced chambers, at least one of said spaced chambers is contracted and another of said spaced chambers is expanded causing said incompressible fluid to flow through said elongate restricted passageway from said contracting chamber to said expanding chamber permitting damping of said rotary vibratory motions.

18. A fluid filled resilient bushing assembly according to claim 17 wherein said chambers are substantially equally circumferentially spaced about said paddle.

19. A fluid filled resilient bushing assembly according to claim 17 wherein said resilient means defines at least one bulgable end wall of each of said chambers to permit damping at a predetermined frequency of less than 50 Hertz.

20. A fluid filled resistant bushing assembly according to claim 17 wherein said resilient means defines two axially spaced bulgable end walls of each of said chambers to permit damping at a predetermined frequency of less than 50 Hertz.

21. A fluid filled resilient bushing assembly according to claim 17 having an elongate restricted passageway extending continuously and annularly through 360° comprising a divider means having (i) a median plate extending lengthwise and dividing said elongate restricted passageway into two adjacent medianly separated passages; (ii) two spaced and proximal solid means extending radially oppositely from said median plate, each solid means sealingly combined with said resilient means to fully block said respective passages; and (iii) an orifice means extending transversely through said median plate between said two solid means fluidly interconnecting said two passages permitting unidirectional flow of said fluid through said two passages for a length greater than the length of said restricted passageway.

22. A fluid filled resilient bushing assembly according to claim 17 having an elongate restricted passageway extending continuously and annularly through 360° comprising a divider means having (i) a median plate extending lengthwise dividing said elongate restricted passageway into two medianly separated and adjacent passages and having two opposite ends thereof; and (ii) two spaced proximal solid means each respectively fixedly attached to an end of said median plate extending radially oppositely to sealingly combine said median plate with said resilient means to fully block said passages at said respective ends; and (iii) a port disposed between and proximal to said two solid means fluidly interconnecting said two passages permitting unidirectional flow of said fluid through said two passages for a length greater than the length of said restricted passageway.

23. A fluid filled resilient bushing assembly according to claim 22 having said restricted passageway disposed radially outwardly of said two spaced chambers between said two spaced chambers and said outer rigid sleeve member, said divider means extends from about 300° to about 350° and said solid means is fixedly secured to said median plate section extending substantially perpendicular.

24. A fluid filled resilient bushing assembly for rotatable oscillation control comprising:
an elongate outer rigid sleeve member;
an elongate inner rigid sleeve member disposed radially inward of said outer sleeve member to define a space therebetween and having two circumferentially spaced paddles projecting radially outwardly therefrom;
a resilient means disposed about said inner member between said inner rigid member and said outer rigid sleeve member, said resilient means defines (a) at least four circumferentially spaced chambers, arranged in two separate pairs having a first pair of chambers substantially diametric about the inner rigid member and positioned about a first radial axis and a second pair of chambers substantially diametric about the inner rigid member and positioned about a second radial axis orthogonal to said first radial axis such that said paddles are located between a chamber of said first pair and a chamber of said second pair; and (b) a restricted passageway interconnecting said four chambers; said spaced chambers including radial walls extending in the radial direction of the bushing assembly and circumferential walls extending in the circumferential direction of the bushing assembly; said restricted passageway interconnecting said spaced chambers only through said circumferential walls; and
an incompressible fluid filling said four chambers and said restricted passageway;
wherein said two paddles contract one pair of chambers during rotation of said inner rigid member.

25. A fluid filled resilient bushing assembly according to claim 24 wherein said chambers are substantially equally circumferentially spaced, and said paddles are each substantially equally circumferentially spaced, between a chamber of said first pair of chambers and a chamber of said second pair of chambers.

26. In a coupling for transferring torque between drive and driven members rotatable about misaligned rotational axes, including connectable means between said drive member and a fluid filled resilient bushing assembly and another connectable means between said driven member and said fluid filled resilient bushing assembly wherein said fluid filled resilient bushing comprises:
an elongate outer rigid sleeve member;
an elongate inner rigid member disposed within and radially spaced from said outer sleeve member to define a space therebetween;
a resilient means disposed about said inner member between said inner rigid member and said outer rigid sleeve member to permit the inner rigid member to rotate bidirectionally with respect to said outer rigid sleeve member while undergoing elastic stress during rotation;
said resilient means defining at least two spaced chambers interconnected by restricted passageway; and
an incompressible fluid filling said spaced chambers and said restricted passageway; said spaced chambers including radial walls extending in the radial direction of the bushing assembly and circumferential walls extending in the circumferential direction of the bushing assembly; said restricted passageway interconnecting said spaced chambers only through said circumferential walls;
a pressure differential inducing means creating a differential in the fluid pressure of said at least two spaced chambers resulting from said rotary movement of the inner rigid member with respect to the outer rigid sleeve member permitting contraction of one chamber, and expansion of the second chamber by fluid flow therebetween via said restricted passageway.

27. A coupling according to claim 26 wherein said restricted passageway is disposed radially outwardly of said two spaced chambers between said two spaced chambers and said outer rigid sleeve member, extends continuously and annularly through 360° and comprises a divider means having (i) a median plate extending lengthwise dividing said elongate restricted passageway into two medianly separated and adjacent passages and having two opposite ends thereof; and (ii) two axially spaced and proximal solid means each respectively fixedly attached and located at the one end and the second end of the median plate extending radially oppositely substantially perpendicular to said median plate and sealingly combined with said resilient means to fully block said ends of said passages at said respective ends; and (iii) a port disposed between and proximal to said two solid means fluidly interconnecting said two passages permitting unidirectional flow of said fluid from a contracting first chamber to the expanding second chamber such that said fluid flows unidirectionally through said two passages for a length greater than the length of said restricted passageway.

28. A coupling according to claim 27 wherein said pressure differential inducing means is a paddle projecting radially outwardly from said inner rigid member and positioned proximally to one of said chambers to permit said paddle to contract the first chamber during rotation of said inner rigid member.

29. A coupling according to claim 28 wherein said resilient means defines at least four circumferentially spaced chambers, arranged in two separate pairs wherein a first pair of chambers are substantially diametric about the inner rigid member and positioned along a first radial axis and a second pair of chambers are substantially diametric about the inner rigid member and positioned along a second radial axis orthogonal to said first radial axis wherein said first pair of chambers are fluidly interconnected with one passage and said second pair of chambers are fluidly interconnected with said second passage.

30. A coupling according to claim 26 wherein said resilient means define at least one bulgable end wall on each of said two spaced chambers to permit damping at a predetermined frequency of less than 50 Hertz.

31. A coupling according to claim 24 wherein said resilient means defines two axially spaced bulgable end walls of each of said two spaced chambers to permit the fluid to resonate in the chamber at a predetermined frequency of less than 50 Hertz.

* * * * *